(12) United States Patent
Summers

(10) Patent No.: US 6,908,134 B1
(45) Date of Patent: Jun. 21, 2005

(54) CARGO BED EXTENDER

(76) Inventor: Jerald E. Summers, 1214 Grassy Hollow Way, Paso Robles, CA (US) 93446

( * ) Notice: Subject to any disclaimer, the term of this patent is extended or adjusted under 35 U.S.C. 154(b) by 0 days.

(21) Appl. No.: 10/746,839

(22) Filed: Dec. 24, 2003

Related U.S. Application Data

(60) Provisional application No. 60/320,058, filed on Mar. 26, 2003.

(51) Int. Cl.$^7$ ................................................ B60P 3/34
(52) U.S. Cl. ...................... 296/26.11; 296/57.1; 296/50
(58) Field of Search .......................... 296/26.11, 57.1, 296/37.6, 165, 50, 26.09, 26.1, 10, 26.06

(56) References Cited

U.S. PATENT DOCUMENTS

| | | | | |
|---|---|---|---|---|
| 2,872,239 | A * | 2/1959 | Bowness et al. | ......... 296/26.11 |
| 4,531,773 | A * | 7/1985 | Smith | ...................... 296/26.11 |
| 5,468,038 | A * | 11/1995 | Sauri | ....................... 296/26.11 |
| 5,752,800 | A * | 5/1998 | Brincks et al. | .......... 296/26.11 |
| 5,765,892 | A * | 6/1998 | Covington | ................. 296/57.1 |
| 5,788,311 | A * | 8/1998 | Tibbals | .................... 296/26.11 |
| 5,857,724 | A * | 1/1999 | Jarman | ................... 296/26.11 |
| 5,902,000 | A * | 5/1999 | Wold | ....................... 296/26.11 |
| 5,924,753 | A * | 7/1999 | DiBassie | ................... 296/26.1 |
| 5,954,383 | A * | 9/1999 | Beck et al. | ................... 296/50 |
| 6,007,127 | A * | 12/1999 | Garofalo | .................. 296/26.11 |
| 6,019,410 | A * | 2/2000 | Trostle et al. | ............ 296/26.11 |
| 6,279,980 | B1 * | 8/2001 | Straschewski | ............. 296/57.1 |
| 6,340,190 | B1 * | 1/2002 | Rosebrugh et al. | ...... 296/26.11 |
| 6,454,338 | B1 * | 9/2002 | Glickman et al. | ......... 296/57.1 |
| 6,550,841 | B1 * | 4/2003 | Burdon et al. | ........... 296/26.11 |
| 6,626,478 | B1 * | 9/2003 | Minton | ..................... 296/26.11 |
| D485,800 | S * | 1/2004 | Smith | ......................... D12/414 |
| 6,676,182 | B2 * | 1/2004 | Fitts | ......................... 296/26.11 |

* cited by examiner

*Primary Examiner*—Kiran B. Patel
(74) *Attorney, Agent, or Firm*—Thomas F. Lebens; Sinsheimer, Schiebelhut & Baggett

(57) ABSTRACT

A cargo bed extender extends the useful length of a cargo bed when the tailgate is open and has an outer shell that is attached to inner side of the tailgate. An end panel slides between the tailgate and outer shell when in a stowed position and is secured on catch hinges when in a deployed position. Side panels are attached to the end panel on hinges that allow the side panels to fold against the end panel and slide as a unit with the end panel between the tailgate and the outer shell. Outer shell end caps slide over the ends of the outer shell adding support and strengthen to the outer shell. Retainers 38 are fastened to the upper rear of the inner side of the pickup truck bed sidewalls to secure the side panel when in a deployed position.

15 Claims, 6 Drawing Sheets

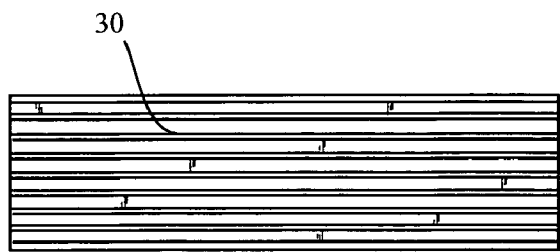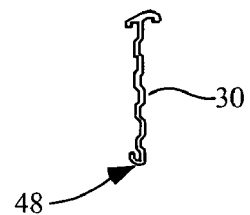
Fig. 4A         Fig. 4B
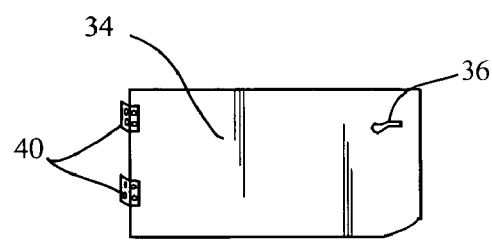
Fig. 5

CARGO BED EXTENDER

RERERENCE TO EARLIER APPLICATION

This application claims priority to U.S. provisional patent application No. 60/320,058 filed Mar. 26, 2003, which is incorporated herein by reference.

BACKGROUND OF THE INVENTION

The filed of the invention relates to automobile cargo beds and more particularly to cargo bed extension devices.

One of the major features of a pickup truck is its cargo bed, allowing for the transportation of loads of cargo (tools, recreational equipment, building materials, etc.). At the rear of a pickup truck's cargo bed, is a tailgate. A tailgate is a hinged door that opens to a horizontal position to facilitate loading and unloading of cargo into the cargo bed and closes to a vertical position to secure items in the cargo bed. In many cases the cargo's size exceeds that available in the cargo bed when the tailgate is closed in the vertical position. Consequently, in this case, the tailgate must be left in the open horizontal position to facilitate transporting the oversized cargo load. This leaves the unsecured oversized cargo load susceptible to falling out, unless a rope or other fastening device is used to secure the oversized cargo load.

There is thus a need in the art for a simple to use cargo bed extender device that is easy to install, economical, durable, is capable of compact stowage, and does not interfere with the normal operation of the pickup truck cargo bed and tailgate.

SUMMARY OF THE INVENTION

The present invention advantageously addresses the needs above as well as other needs by providing a cargo bed extender device that is easy to install, economical, durable, is capable of compact stowage, and does not interfere with the normal operation of the pickup truck cargo bed and tailgate.

In one embodiment, the invention can be characterized as a cargo bed extender comprising a first panel having an edge formed as a first hinge catch, a second panel having an edge formed as a second hinge catch wherein the second hinge catch engages the first hinge catch when the second panel is in a deployed position. A third panel and a fourth panel are each hinged to respective edges of the second panel, said edges of the second panel are located on opposite sides of the edge formed as the second hinge catch.

In another embodiment, the invention can be characterized as a cargo bed extender comprising a cargo bed tailgate panel with a slot at a top edge of the tailgate panel with an inner edge of the slot formed as a first hinge catch and a second panel having an edge formed as a second hinge catch. The second hinge catch engages the first hinge catch when the second panel is in a deployed position. A third panel and a fourth panel are each hinged on respective hinges to respective edges of the second panel, said edges of the second panel are located on opposite sides of the edge formed as the second hinge catch.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 4 is a top and end perspective of an end panel of the embodiment of FIG. 1;

FIG. 5 is a side view of a side panel of the embodiment of FIG. 1;

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
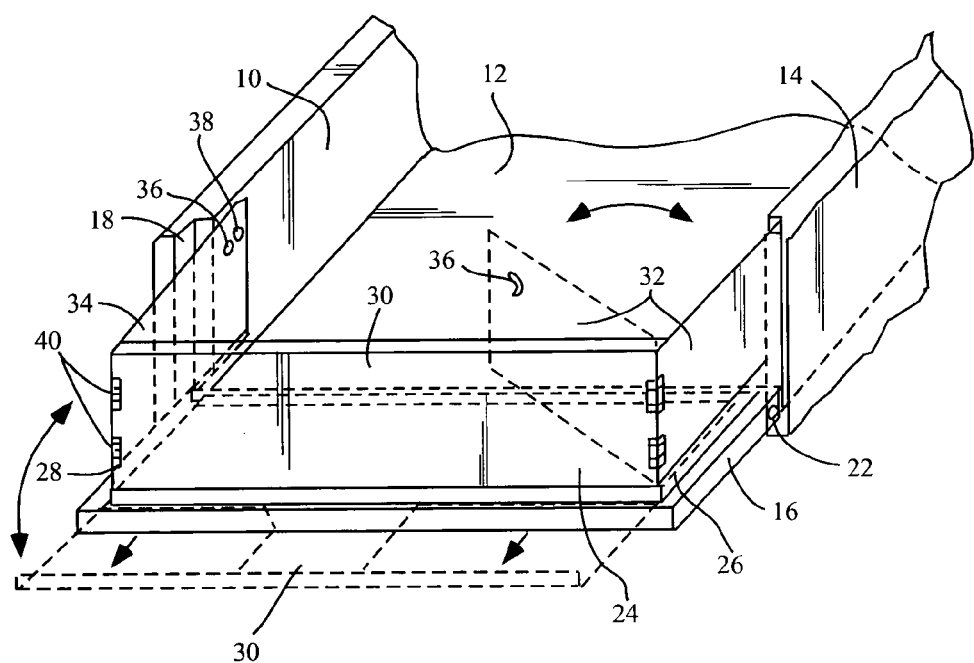
FIG. 1 is a partial rear perspective view of a pickup truck cargo bed with an embodiment of the present invention mounted on a tailgate of the cargo bed.

Referring to FIG. 1, shown is a partial rear perspective view of a pickup truck (or other vehicle) cargo bed with an embodiment of the present invention mounted on a tailgate of the cargo bed.

Depicted are a pickup truck bed floor 12, a left pickup truck bed sidewall 10, a right pickup truck bed sidewall 14, a retainer 38, an oblong slot 36, a tailgate' 16, a tailgate jam 18, a tailgate hinge 22, an outer shell 24, end caps 26, 28, a left side panel 34, a right side panel 32, side panel hinges 40, and an end panel 30.

The right and left pickup truck bed sidewalls 10, 14 extend vertically from sides of the pickup truck bed floor 12.

The tailgate 16 has hinges 22 attached at the lower rear of the inner sides of pickup truck bed sidewalls 10, 14, allowing the tailgate 16 to swivel up and down (to vertical and horizontal positions, respectively) to facilitate opening and closing of the tailgate 16.

In accordance with the present embodiment, the outer shell 24 is attached to an inner side of the tailgate 16. The outer shell end caps 26, 28 slide over the ends of the outer shell 24 adding support and strength to the outer shell 24. Retainers 38 are fastened to the upper rear of the inner side of the pickup truck bed sidewalls 10, 14.

The side panels 32, 34 are pivotally attached to the end panel 30 by the end panel hinges 40.

The end panel 30, with the attached side panels 32, 34, pivotally attached thereto and in a positional substantially parallel thereto, is positioned and slidable behind the outer shell.

In a "lowered position," the end panel is concealed fully behind the outer shell, with the exception of lip at an outer edge of the end panel, which engages a distal edge of the tailgate. In this lowered position, the tailgate is operable into its raised and lowered positions, and the end panel is substantially concealed from view behind the outer shell, except for the lip that engages the distal edge of the tailgate.

In a "raised position," the end panel is slid from behind the outer shell, with a channel formed adjacent to the outer shall at an inner edge of the end panel engaging a channel formed adjacent to the end panel at the distal edge of the tailgate. With the end panel in the raised position, the channels cooperate and function as a hinge so as to allow rotation of the end panel from a position parallel to the outer shell, across the plane of the outer shell, to a position substantially normal to the outer shell. In this rotated position, the side panels are deployed toward the left and right pickup bed sidewalls to positions substantially normal to the end panel, and, simultaneously, substantially normal to the outer shell, thereby forming two end walls of a box, the rear of which is the end panel, and the bottom of which is the outer shell. The side panels are secured to the left and right pickup bed sidewalls, such as with a fastener, so as to prevent rotation of the sidewalls relative to.

Figures 2A, 2B:
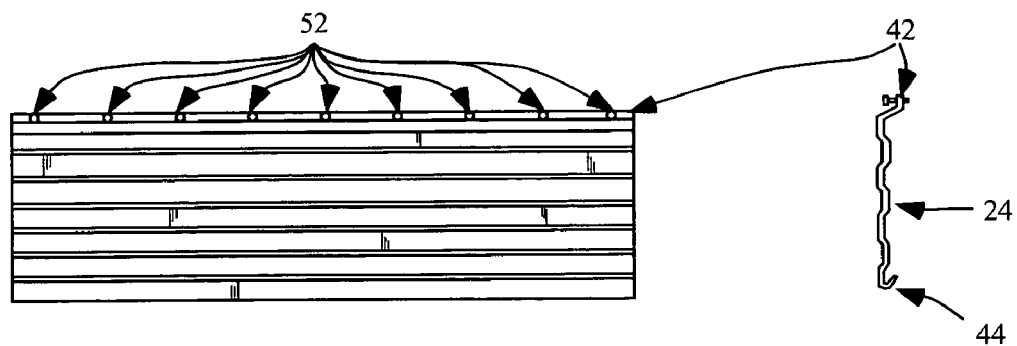
FIG. 2 is a top and end perspective of an outer shell of the embodiment of FIG. 1.

Referring next to FIG. 2, shown is a top and end perspective view of an outer shell of the embodiment of FIG. 1.

Illustrated are an outer shell 24, having one edge formed as a hinge catch 44 (or channel 44), and an opposite edge expressed as a beveled flange 42 (or lip), the beveled flange 42 containing mounting screw holes 52 therein. The hinge catch 44 facilitates opening and closing of the end panel 30 (FIG. 1) when the end panel 30 is deployed. The outer shell mounting screw holes 52 (and corresponding mounting screws) secure the outer shell 24 to the tailgate 16 (FIG. 1) of the pickup truck.

Figure 3:
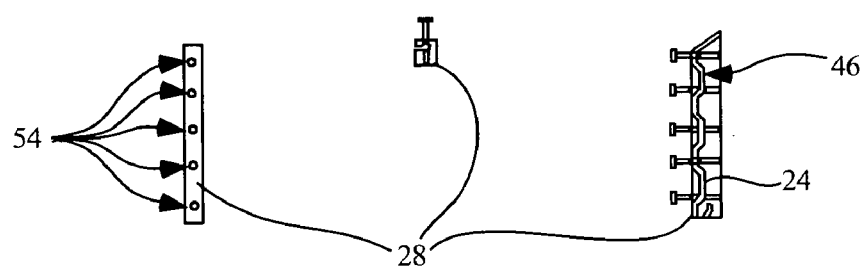
FIG. 3 is a top, end, and side view of an end cap of the embodiment of FIG. 1.

Referring next to FIG. 3, shown is a top, end, and side view of an end cap of the embodiment of FIG. 1.

Depicted is the end cap 28, containing retaining slots 46 and mounting screw holes 54. The end cap 28 slides over the ends of the outer shell 24, adding support and strength to the outer shell 24. The end cap mounting screw holes 54, allow the end cap 28 to be secured to the inner wall of the tailgate 16 (FIG. 1) of the pickup truck.

Referring next to FIG. 4, shown is a top and end perspective view of an end panel of the embodiment of FIG. 1. This figure illustrates the end panel 30, having one edge formulated as a hinge catch 48 (or channel 48). The hinge catch 48 acts as a stop and hinge in conjunction with the outer shell hinge catch 44 (FIG. 2).

Referring next to FIG. 5, shown is a side view of a side panel of the embodiment of FIG. 1. Shown is the side panel 34, containing an oblong slot and side panel hinges 40. The oblong slot 36, which is curved and has a circular cutout at one end, allows the side panel 34 to be fastened by means of a retainer 38 (FIG. 1.) to the left pickup truck sidewall 10 (FIG. 1). (A similar structure allows the side panel to the fastened by means of a retainer (FIG. 1) to the right pickup truck sidewall (FIG. 1). The side panel hinges 40 provide means for attaching the side panel 34 to the end of the end panel 30 (FIG. 1), as well as enabling side panel 34 to be folded inward for stowage and outward for deployment.

Figure 6:
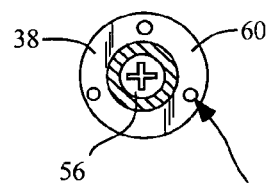
FIG. 6 is a top and side view of a retainer of the embodiment of FIG. 1.
Figure 6A:
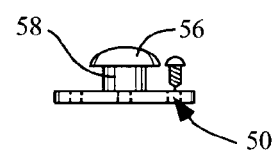

Referring next to FIG. 6, shown is a top and side view of a retainer 38 of the embodiment of FIG. 1.

A retainer 38 is shown comprised of a retainer base 60 with mounting screw holes 50, retainer head 56, and retainer neck 58.

Figure 7:
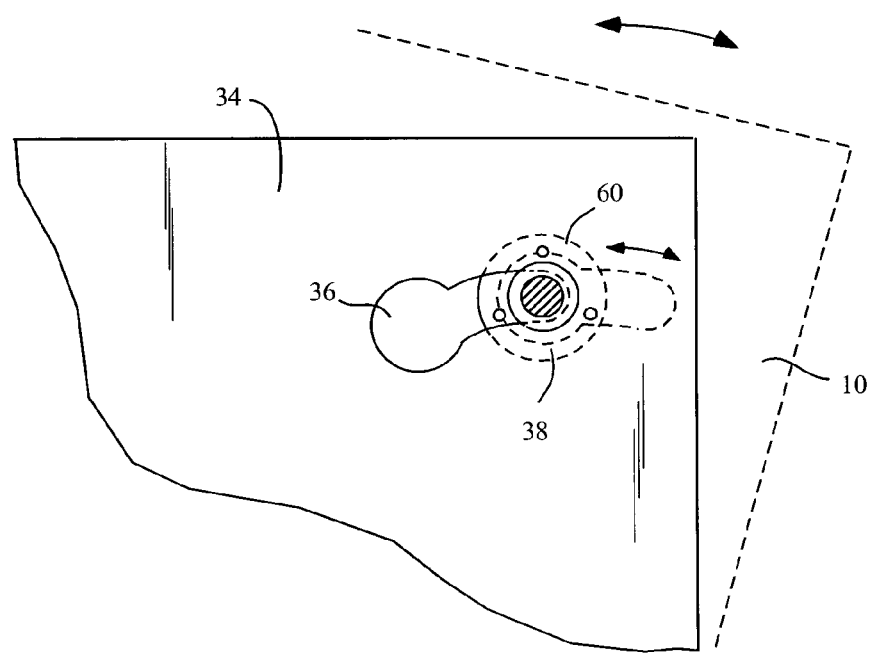
FIG. 7 is a perspective of the retainer of FIG. 6 functioning with the side panel of FIG. 5 and an oblong slot of the embodiment of FIG. 1.

Referring next to FIG. 7, shown is a perspective of the retainer 38 of FIG. 6 functioning with the side panel 34 of FIG. 5 and an oblong slot of the embodiment of FIG. 1.

Shown is retainer 38 (with mounting screw holes 50 in the base 60 of the retainer) in relation to side panel 34 and sidewall of a pickup truck bed 10. The retainer 38 is attached to the upper-rear of the inner side of the pickup truck bed sidewall 10. The large end of oblong slots 36 (keyhole slots) in the side panel 34 is larger than retainer head 56. The oblong slot 36 in the side panel 34 engages the retainers 38 when the rear edge of the tailgate 16 (FIG. 1) is slighted lifted in the vertical direction, enabling large end of the oblong slots 36 to align with and fit over the retainer head 56. Then, lowering the tailgate 16 back to the horizontal position slides the retainer 38 to the narrow end of the oblong slot 36 (where the oblong slots are smaller than the retainer head 56), securing the side panel 34 against the sidewall 10 of the pickup trick bed.

Figure 8:
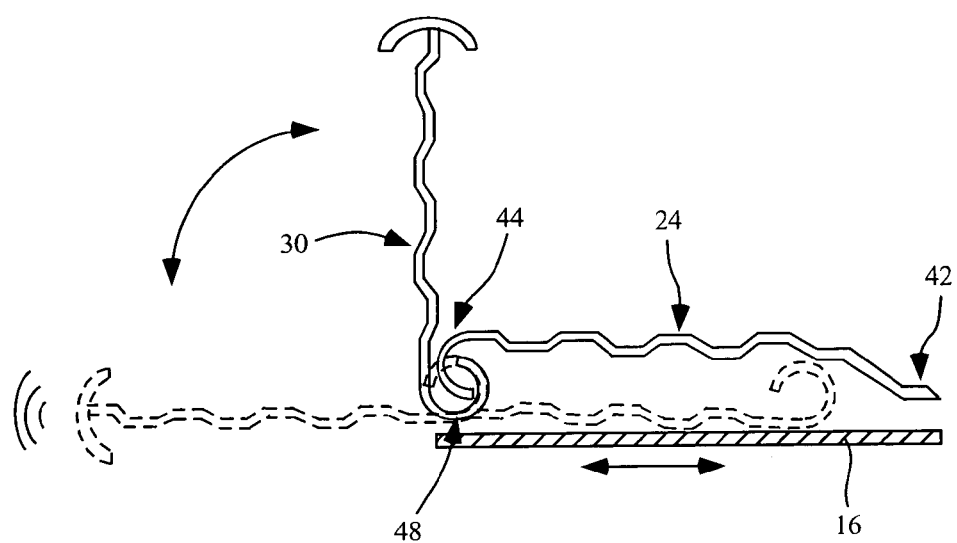
FIG. 8 is a side cross sectional view of the outer shell of FIG. 2 functioning with the end panel of FIG. 4.

Referring next to FIG. 8, shown is a side cross-sectional view of the outer shell 24 of FIG. 2 functioning with the end panel 30 of FIG. 4.

This side view displays the end panel 30, the end panel hinge catch 48, the outer shell 24, the outer shell hinge catch 44, the beveled flange edge 42 of the outer shell, and the tailgate 16.

The end panel 30 slides between the outer shell 24 and the pickup truck tailgate 16 for compact stowage.

When tailgate 16 is open in a horizontal position, the end panel 30 is deployed by sliding it out horizontally from under the outer shell 24 until end panel hinge catch 48 locks in place against the outer shell hinge catch 44 forming a hinge. The present embodiment is then deployed by rotating the end panel 30 into a vertical position, folding out the side panels 32, 34 (FIG. 1) by rotating the side panels away from the end panel on their hinges and securing the side panels against the inner side of the pickup truck sidewalls 10 14 (FIG. 1) by means of oblong slots in the side panels and respective retainers 38 (FIG. 1) in the pickup trick side panels.

Figure 9:
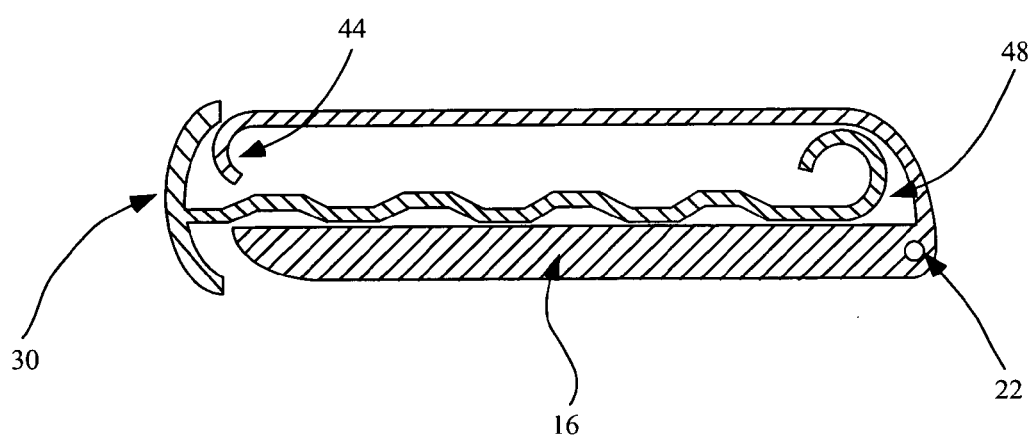
FIG. 9 is a side cross-sectional view of an alternative embodiment of the present invention.

Referring next to FIG. 9, shown is a side cross-sectional view of an alternative embodiment of the present invention.

This view shows a cargo bed tailgate panel 16, tailgate hinges 22, end panel 30 and end panel hinge catches 44, 48. In accordance with the present embodiment, the cargo bed tailgate panel 16 has a slot at a top edge of the tailgate panel 16, wherein an inner edge of the slot is formed as a first hinge catch 48. The cargo bed tailgate panel is used in the present embodiment in lieu of the outer shell of the previous embodiment. As a result, an aesthetically pleasing "OEM" look is achieved, with the present embodiment being virtually undetectable when not deployed.

The end panel 30 has an edge formed as a second hinge catch 44 wherein the second hinge catch engages the first hinge catch when the end panel 30 is in a deployed position. A left and right side panel (not shown) are each hinged on respective edges of the end panel as shown in FIG. 1 and described above in previous embodiments. The left and right side panels fold in on their respective hinges such that they are substantially parallel to the end panel when in a stowed position (as described above). Thus, when the cargo bed extender is stowed it is conveniently and discretely located within the cargo bed tailgate panel 16 giving the pickup truck a clean, unmodified look.

Therefore, it will be appreciated that the present invention, in some embodiments, provides a useful and simple to use cargo bed compact extender device that is easy to install, economical, and durable. It will be further appreciated that when not solving the problem created by oversized cargo loads, the present embodiment is capable of compact stowage, and does not interfere with the normal operation of the pickup truck cargo bed and tailgate.

While the invention herein disclosed has been described by means of specific embodiments and applications thereof, numerous modifications and variations could be made thereto by those skilled in the art without departing from the scope of the invention set forth in the claims.

What is claimed is:

1. A cargo bed extender comprising:
    a first panel having an edge formed as a first hinge catch;
    a second panel having an edge formed as a second hinge catch wherein the second hinge catch engages the first hinge catch when the second panel is in a deployed position; and
    a third panel and a fourth panel, each hinged to respective edges of the second panel, said edges of the second panel located on opposite sides of the edge formed as the second hinge catch.

2. The cargo bed extender of claim 1 wherein the third and fourth panels are so hingedly attached to the second panel that the third and fourth panels may fold in on their respective hinges such that they are substantially parallel to the second panel when in a stowed position.

3. The cargo bed extender of claim 2 wherein the second, third and fourth panels are slidably stowable beneath and substantially parallel to the first panel.

4. The cargo bed extender of claim 3 wherein the first panel is attached to an inner surface of a cargo bed tailgate at a beveled edge of the first panel that is opposite the edge formed as the first hinge catch, said bevel is of sufficient width to leave a gap between the first panel and the tailgate to allow slidable insertion into the gap of the second, third and fourth panels when in a stowed position.

5. The cargo bed extender of claim 4 further comprising:
    at least one retainer affixed to each sidewall of a cargo bed; and
    at least one slot in each the third and fourth panels into which the retainer is positioned to secure the third and fourth panels to the sidewalls of the cargo bed when the third and fourth panels are in a deployed position.

6. The cargo bed extender of claim 5 wherein the slots in the third and fourth panel are oblong and each have one end that is larger than the retainer such that the larger ends fit over a head of each retainer and the retainers are slidable to a narrow end of each respective slot when the third and fourth panels are moved to a substantially horizontal position.

7. The cargo bed extender of claim 6 further comprising a first and second end cap wherein the first and second end caps, respectively, encase respective ends of the first panel.

8. The cargo bed extender of claim 7 wherein at least one of the first, second and third panels are made of corrugated injected molded plastic.

9. The cargo bed extender of claim 7 wherein the first, second and third panels are all made of corrugated injected molded plastic.

10. The cargo bed extender of claim 1 wherein the first panel comprises a cargo bed tailgate panel with a slot at a top edge of the cargo bed tailgate panel, an inner edge of the slot formed as the first hinge catch.

11. A method of extending a cargo bed comprising:
    extending a first panel in a direction parallel to a tailgate;
    rotating the first panel at a first pivot to form a back panel of the cargo bed;
    rotating a second panel that is hingably attached to the first panel to form at least a portion of a first side of the cargo bed; and
    rotating a third panel that is hingably attached to the first panel to form at least a portion of a second side of the cargo bed.

12. The method of extending a cargo bed of claim 11 further comprising:
    securing the second panel to the first side of the cargo bed; and
    securing the third panel to the second side of the cargo bed.

13. The method of extending a cargo bed of claim 11 further comprising:
    forming a gap between a fourth panel and the tailgate; and
    stowing the first panel, the second panel and the third panel in the gap formed between the fourth panel and the tailgate.

14. The method of extending a cargo bed of claim 11 wherein the second panel and the third panel are so hingedly attached to the first panel that the second panel and the third panel fold to a substantially parallel position to the first panel when in a stowed position.

15. The method of extending a cargo bed of claim 11 further comprising stowing the first panel, the second panel and the third panel in a gap inside the tailgate.

* * * * *